United States Patent
Kahle

(10) Patent No.: US 7,010,626 B2
(45) Date of Patent: Mar. 7, 2006

(54) DMA PREFETCH

(75) Inventor: James Allan Kahle, Austin, TX (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 11/057,454

(22) Filed: Feb. 14, 2005

(65) Prior Publication Data

US 2005/0144337 A1 Jun. 30, 2005

Related U.S. Application Data

(63) Continuation of application No. 10/401,411, filed on Mar. 27, 2003, now abandoned.

(51) Int. Cl.
*G06F 13/28* (2006.01)

(52) U.S. Cl. .............. 710/22; 710/3; 710/29; 710/31; 710/33; 711/213; 712/28

(58) Field of Classification Search .......... 710/22, 710/23, 25, 27, 28, 29, 30, 31
See application file for complete search history.

(56) References Cited

U.S. PATENT DOCUMENTS

| | | | | |
|---|---|---|---|---|
| 5,822,616 A | * | 10/1998 | Hirooka | 710/22 |
| 5,953,538 A | * | 9/1999 | Duncan et al. | 710/22 |
| 6,178,533 B1 | * | 1/2001 | Chang | 714/739 |
| 6,247,094 B1 | * | 6/2001 | Kumar et al. | 711/3 |
| 6,636,906 B1 | * | 10/2003 | Sharma et al. | 710/22 |
| 6,658,537 B1 | * | 12/2003 | Hughes et al. | 711/141 |
| 6,697,916 B1 | * | 2/2004 | Lasserre et al. | 711/118 |
| 6,842,822 B1 | * | 1/2005 | Snyder et al. | 711/118 |
| 2003/0154349 A1 | * | 8/2003 | Berg et al. | 711/137 |

* cited by examiner

*Primary Examiner*—Kim Huynh
*Assistant Examiner*—Alan S Chen
(74) *Attorney, Agent, or Firm*—CARR LLP; Diana R. Gerhardt

(57) ABSTRACT

A method and an apparatus are provided for prefetching data from a system memory to a cache for a direct memory access (DMA) mechanism in a computer system. A DMA mechanism is set up for a processor. A load access pattern of the DMA mechanism is detected. At least one potential load of data is predicted based on the load access pattern. In response to the prediction, the data is prefetched from a system memory to a cache before a DMA command requests the data.

21 Claims, 3 Drawing Sheets

DMA PREFETCH

CROSS-REFERENCE TO RELATED APPLICATIONS

This application is a continuation of, and claims the benefit of the filing date of, U.S. patent application Ser. No. 10/401,411 entitled "DMA PREFETCH" filed Mar., 27, 2003, now abandoned.

BACKGROUND OF THE INVENTION

1. Field of the Invention

The invention relates generally to memory management and, more particularly, to prefetching data to a cache in a direct memory access (DMA) mechanism.

2. Description of the Related Art

In a multiprocessor design, a DMA mechanism is to move information from one type of memory to another. The DMA mechanism such as a DMA engine or DMA controller also moves information from a system memory to a local store of a processor. When a DMA command tries to move information from the system memory to the local store of the processor, there is going to be some delay in fetching the information from the system memory to the local store of the processor.

Therefore, a need exists for a system and method for prefetching data from a system memory to a cache for a direct memory access (DMA) mechanism in a computer system.

SUMMARY OF THE INVENTION

The present invention provides a method and an apparatus for prefetching data from a system memory to a cache for a direct memory access (DMA) mechanism in a computer system. A DMA mechanism is set up for a processor. A load access pattern of the DMA mechanism is detected. At least one potential load of data is predicted based on the load access pattern. In response to the prediction, the data is prefetched from a system memory to a cache before a DMA command requests the data.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, it will be apparent to those skilled in the art that the present invention may be practiced without such specific details. In other instances, well-known elements have been illustrated in schematic or block diagram form in order not to obscure the present invention in unnecessary detail.

It is further noted that, unless indicated otherwise, all functions described herein may be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
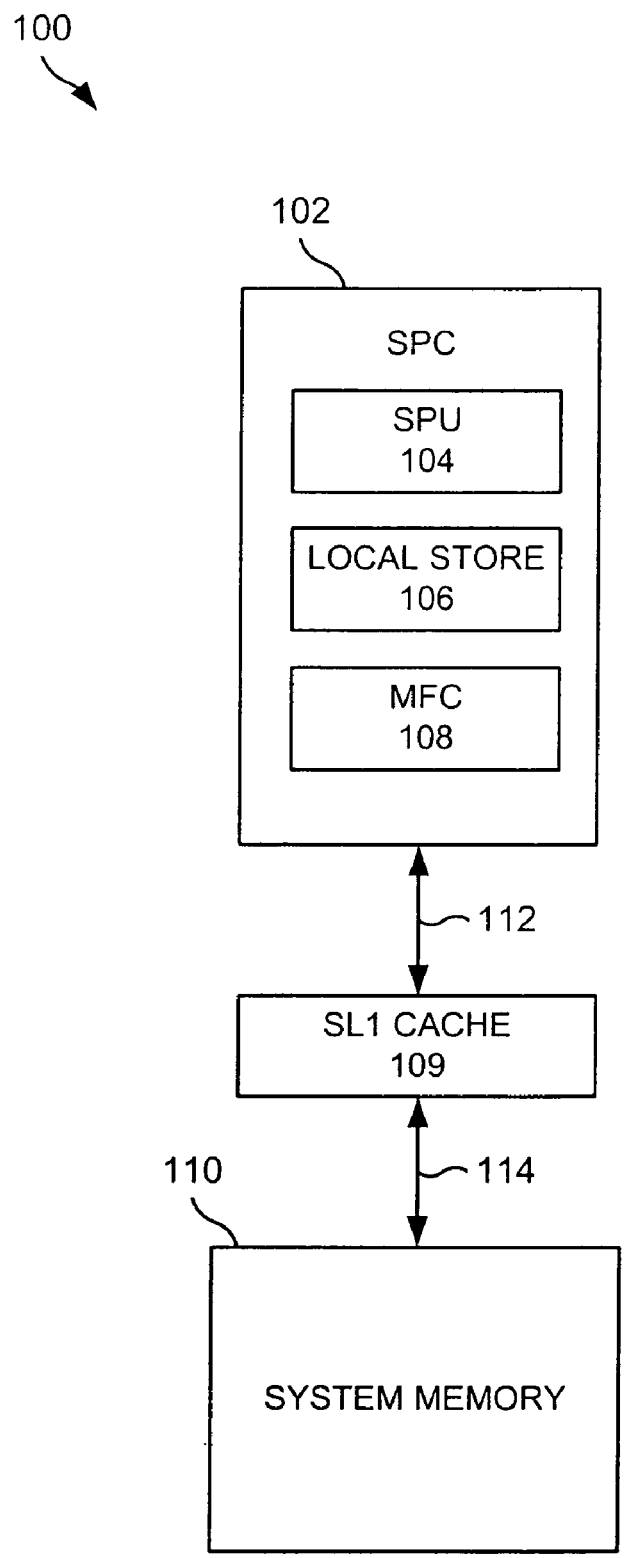
FIG. 1 shows a block diagram illustrating a single processor computer system adopting a cache along with a direct memory access (DMA) mechanism.

Referring to FIG. 1 of the drawings, the reference numeral 100 generally designates a single processor computer system adopting a cache in a direct memory access (DMA) mechanism. The single processor computer system 100 comprises a synergistic processor complex (SPC) 102, which includes a synergistic processor unit (SPU) 104, a local store 106, and a memory flow controller (MFC) 108. The single processor computer system also includes an SPU's L1 cache (SL1 cache) 109 and a system memory 110. The SPC 102 is coupled to the SL1 cache 109 via a connection 112. The SL1 cache 109 is coupled to the system memory 110 via a connection 114. The MFC 108 functions as a DMA controller.

Once the MFC 108 is set up to perform data transfers between the system memory 110 and the local store 106, a load access pattern of the MFC 108 is detected. The load access pattern generally contains information on the data being transferred. The load access pattern can be used to predict future data transfers and prefetch data to the SL1 cache 109 before the MFC 108 actually requests the data. When the MFC 108 actually requests the data, the MFC 108 does not have to go all the way back to the system memory 110 to retrieve the data. Instead, the MFC 108 accesses the SL1 cache 109 to retrieve the data and transfer the data to the local store 106.

Preferably, the MFC 108 checks the SL1 cache 109 first for any data. If there is a hit, the MFC 108 transfers the data from the SL1 cache 109 to the local store 106. If there is a miss, the MFC 108 transfers the data from the system memory 110 to the local store 106.

Figure 2:
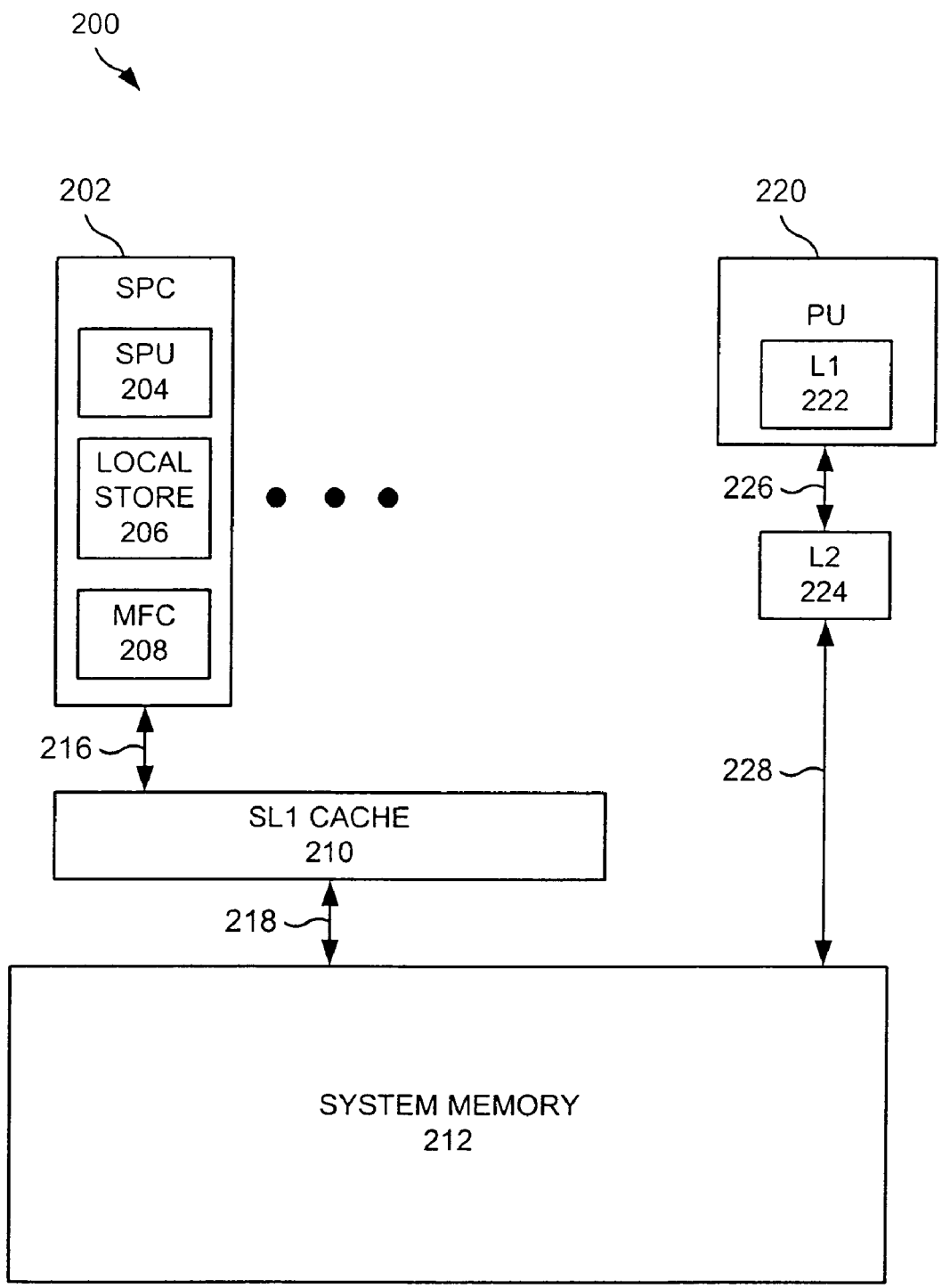
FIG. 2 shows a block diagram illustrating a multiprocessor computer system adopting a cache along with a DMA mechanism.

FIG. 2 is a block diagram illustrating a multiprocessor computer system 200 adopting a cache in a DMA mechanism. The multiprocessor computer system 200 has one or more synergistic processor complexes (SPCs) 202. The SPC 202 has a synergistic processor unit (SPU) 204, a local store 206, and a memory flow controller (MFC) 208. The multiprocessor computer system 200 further comprises an SPU's L1 cache (SL1 cache) 210 and a system memory 212. The SL1 cache 210 is coupled between the SPC 202 and the system memory 212 via connections 216 and 218. Note here that the single SL1 cache 210 is used to interface with all the SPCs 202. In different implementations, however, a plurality of caches may be used. Additionally, the multiprocessor computer system 200 comprises a processing unit (PU) 220, which includes an L1 cache 222. The multiprocessor computer system 200 further comprises an L2 cache 224 coupled between the PU 220 and the system memory 212 via connections 226 and 228.

Once the MFC 208 is set up to perform data transfers between the system memory 212 and the local store 206, a load access pattern of the MFC 208 is detected. The load access pattern generally contains information on the data being transferred. The load access pattern can be used to predict future data transfers and prefetch data to the SL1 cache 210 before the MFC 208 actually requests the data. When the MFC 208 actually requests the data, the MFC 208 does not have to go all the way back to the system memory 212 to retrieve the data. Instead, the MFC 208 accesses the SL1 cache 210 to retrieve the data and transfer the data to the local store 206.

Figure 3:
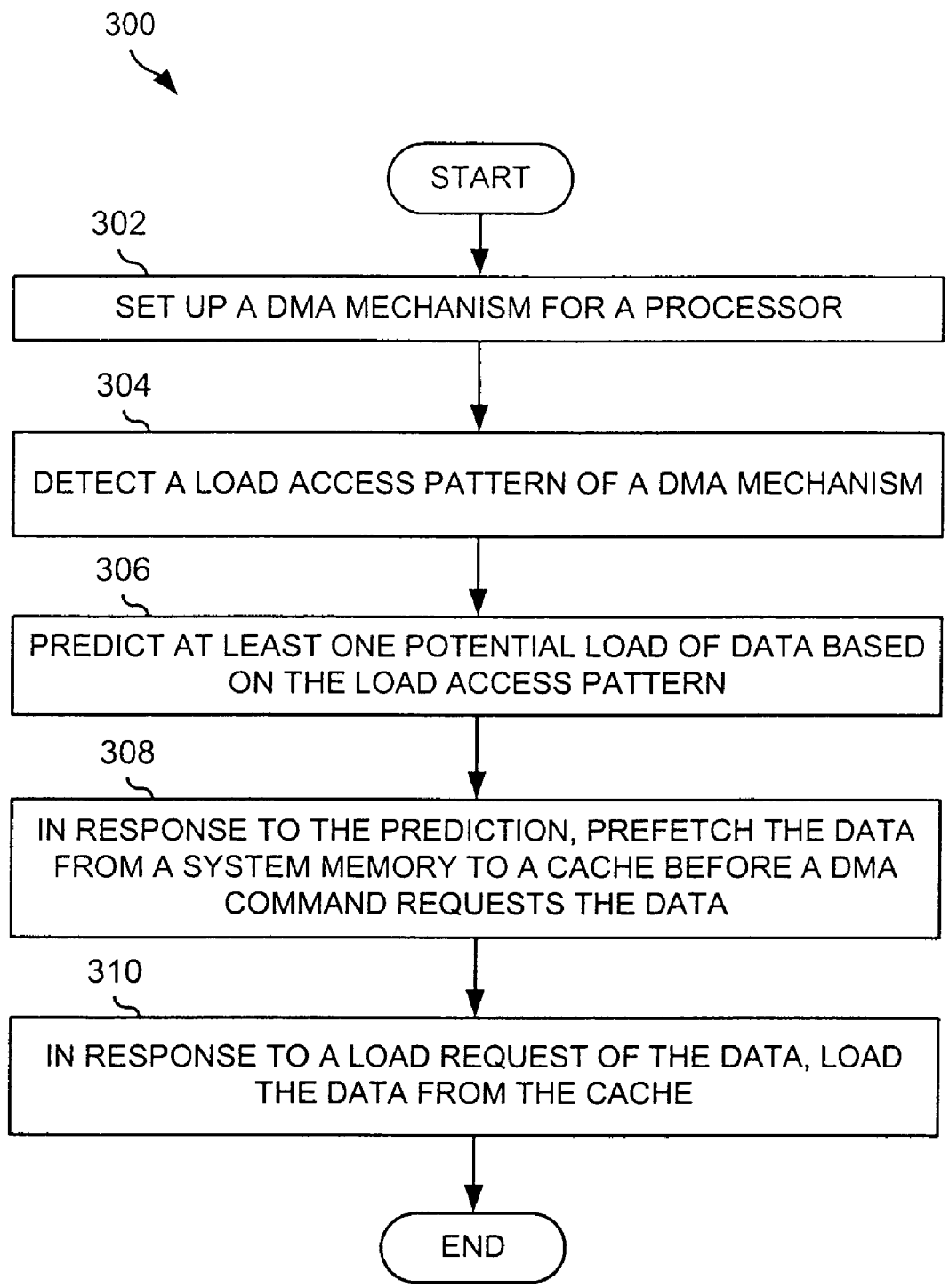
FIG. 3 shows a flow diagram illustrating prefetching mechanism applicable to a DMA mechanism as shown in FIGS. 1 and 2.

Now referring to FIG. 3, shown is a flow diagram illustrating a prefetching mechanism 300 applicable to a DMA mechanism as shown in FIGS. 1 and 2.

In step 302, the DMA mechanism is set up for a processor. In FIG. 1, for example, the MFC 108 is set up for the SPC 102. In FIG. 2, for example, the MFC 208 is set up for the SPC 202. In step 304, a load access pattern of the DMA mechanism is detected. In streaming data, for example, a load of a first piece of data leads to a subsequent load of a second piece of data stored adjacently to the first piece of data in a logical address space. Therefore, in this example, it is very likely that the second piece of data will be requested to be loaded soon after the load of the first piece.

In step 306, at least one potential load of data is predicted based on the load access pattern. In the same example, the second piece of data is predicted to be loaded soon. In step 308, in response to the prediction, the data is prefetched from the system memory to the cache before a DMA command requests the data. In step 310, in response to a DMA load request of the data, the data is loaded from the cache.

It will be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

What is claimed is:

1. A method for prefetching data from a system memory to a cache for a direct memory access (DMA) in a multi-processor computer system having a plurality of processor complexes (PCs) and at least one processing unit, wherein each PC comprises a processor unit (PU) coupled to a local store and a memory flow controller (MFC), the method comprising the steps of:
coupling the cache to each MFC and the system memory such that the cache interfaces all PCs to each other and each PC to the system memory;
requesting, by a first MFC in a first PC, data from the system memory to be transferred to a first local store for processing by a first PU;
detecting a load access pattern of the data by the first MFC;
predicting at least one potential load of data based on the load access pattern;
in response to the prediction, prefetching the potential load of data from the system memory to the cache before a DMA command requests the potential load of data; and
in response to any one of the plurality of MFCs issuing a DMA command request for the potential load of data, fetching the potential load of data directly from the cache to the local store coupled to the issuing MFC without accessing system memory.

2. The method of claim 1, further comprising the step of, in response to a DMA load request of the data, loading the data from the cache.

3. The method of claim 1, wherein the computer system includes a plurality of processors sharing the cache, further comprising the step of loading the data from the cache to one or more of the plurality of processors.

4. The method of claim 2, further comprising the step of issuing the DMA load request of the data.

5. The method of claim 1, wherein the load access pattern includes a pattern of consecutively loading two or more pieces of data adjacently stored in a logical address space.

6. The method of claim 5, wherein the step of predicting at least one potential load of data based on the load access pattern comprises the step of predicting a potential load of a first piece of data after a DMA load request of a second piece of data stored adjacently to the first piece of data in a logical address space.

7. The method of claim 1, wherein the processor includes a local store, and wherein the data is loaded from the cache to the local store of the processor.

8. An apparatus for prefetching data from a system memory to a cache for direct memory access (DMA) in a multi-processor computer system having a plurality of processor complexes (PCs) and at least one processing unit, wherein each PC comprises a processor unit (PU) coupled to a local store and a memory flow controller (MFC), the apparatus comprising:
means for coupling the cache to each MFC and the system memory such that the cache interfaces all PCs to each other and each PC to the system memory;
means for requesting, by a first MFC in a first PC, data from the system memory to be transferred to a first local store for processing by a first PU;
means for detecting a load access pattern of the data by the first MFC;
means for predicting at least one potential load of data based on the load access pattern;
means for, in response to the prediction, prefetching the potential load of data from the system memory to the cache before a DMA command requests the potential load of data; and
means for, in response to any one of the plurality of MFCs issuing a DMA command request for the potential load of data, fetching the potential load of data directly from the cache to the local store coupled to the issuing MFC without accessing system memory.

9. The apparatus of claim 8, further comprising means for, in response to a DMA load request of the data, loading the data from the cache.

10. The apparatus of claim 9, further comprising means for issuing the DMA load request of the data.

11. The apparatus of claim 8, wherein the computer system includes a plurality of processors sharing the cache, the apparatus further comprising means for loading the data from the cache to one or more of the plurality of processors.

12. The apparatus of claim 8, wherein the load access pattern includes a pattern of consecutively loading two or more pieces of data adjacently stored in a logical address space.

13. The apparatus of claim 12, wherein the means for predicting at least one potential load of data based on the load access pattern comprises means for predicting a potential load of a first piece of data after a DMA load request of a second piece of data stored adjacently to the first piece of data in a logical address space.

14. The apparatus of claim 8, wherein the processor includes a local store, and wherein the data is loaded from the cache to the local store of the processor.

15. A computer program product for prefetching data from a system memory to a cache for a direct memory access (DMA) in a multi-processor computer system having a plurality of processor complexes (PCs) and at least one processing unit, wherein each PC comprises a processor unit (PU) coupled to a local store and a memory flow controller (MFC), the computer program product comprising:
- computer program code for coupling the cache to each MFC and the system memory such that the cache interfaces all PCs to each other and each PC to the system memory;
- computer program code for requesting, by a first MFC in a first PC, data from the system memory to be transferred to a first local store for processing by a first PU;
- computer program code for detecting a load access pattern of the data by the first MFC;
- computer program code for predicting at least one potential load of data based on the load access pattern;
- computer program code for in response to the prediction, prefetching the potential load of data from the system memory to the cache before a DMA command requests the potential load of data; and
- computer program code for, in response to any one of the plurality of MFCs issuing a DMA command request for the potential load of data, fetching the potential load of data directly from the cache to the local store coupled to the issuing MFC without accessing system memory.

16. The computer program product of claim 15, the computer program further comprising computer program code for, in response to a DMA load request of the data, loading the data from the cache.

17. The computer program product of claim 16, the computer program further comprising computer program code for issuing the DMA load request of the data.

18. The computer program product of claim 15, wherein the computer system includes a plurality of processors sharing the cache, the computer program further comprising computer program code for loading the data from the cache to one or more of the plurality of processors.

19. The computer program product of claim 15, wherein the load access pattern includes a pattern of consecutively loading two or more pieces of data adjacently stored in a logical address space.

20. The computer program product of claim 19, wherein the computer program code for predicting at least one potential load of data based on the load access pattern comprises computer program code for predicting a potential load of a first piece of data after a DMA load request of a second piece of data stored adjacently to the first piece of data in a logical address space.

21. The computer program product of claim 15, wherein the processor includes a local store, and wherein the data is loaded from the cache to the local store of the processor.

* * * * *